Aug. 28, 1956 W. MÜLLER 2,761,016

MAGNETIC SOUND RECORDING AND REPRODUCING HEAD

Filed Jan. 12, 1951 3 Sheets-Sheet 1

Inventor
Willy Müller
By
Singer, Stern & Carlberg
Attys.

Aug. 28, 1956 W. MÜLLER 2,761,016

MAGNETIC SOUND RECORDING AND REPRODUCING HEAD

Filed Jan. 12, 1951 3 Sheets-Sheet 2

Inventor
Willy Müller
By
Singer Stern & Carlberg
Attys

MAGNETIC SOUND RECORDING AND REPRODUCING HEAD

Filed Jan. 12, 1951 3 Sheets-Sheet 3

Inventor
Willy Müller
By
Singer Stern & Carlberg
attys.

United States Patent Office 2,761,016

Patented Aug. 28, 1956

2,761,016

MAGNETIC SOUND RECORDING AND REPRODUCING HEAD

Willy Müller, Zurich, Switzerland

Application January 12, 1951, Serial No. 205,644

8 Claims. (Cl. 179—100.2)

Magnetic sound recording and reproducing heads with electromagnets having two flat pole pieces lying in the same plane, magnetically separated from one another by an operative air gap, have been suggested in the past, the outer narrow faces of the said pole pieces being intended to bear against a sound track carrier which is moved relative to the sound-head. Such sound-heads are used for sound recording in helices of line-by line, following the principle of longitudinal magnetisation, in connection with a magnetogram carrier which contains finely divided ferromagnetic powder at least in an upper layer.

The invention has the object of solving by means of simple structural means the following very important problems incurred with such sound-heads:

In the first place it is of great importance with sound heads of this kind that the operative width of the working air gap between the pole pieces does not vary in operation, which means that a reliable mechanical stability in the mutual position of the pole pieces must be achieved. This requirement is not easily fulfilled because the width of the air gap amounts to not more than about 0.008 to 0.016" so that already small movement of the pole pieces relative to one another result in a considerable proportional change of the air gap. On the other hand the operative thickness of the pole pieces, too, is kept small in view of the narrow record track (0.008 to 0.04"). In order to achieve a stable location of the pole pieces in spite of these small cross sectional dimensions of the material, it has been already suggested to make the magnetic system as a whole, or if it forms a laminated structure at least the laminations thereof as a closed piece, and to mill the working air gap out after the sound-head has been finished. By this measure, however, the winding of the core of the coils is made extraordinarily difficult, because then special annular coil-making machines have to be provided. Moreover with the application of this measure any break down of the coil or of the magnetic part of the sound head has the consequence, that the electromagnet has to be replaced as a whole, because neither the coil nor the magnetic system can be replaced or repaired per se.

Another difficulty of the known sound-heads which is to be overcome according to the present invention consists in the rapid mechanical wearing out of the pole pieces because the same must consist of a highly permeable and accordingly relatively soft material on which the moving sound track carrier acts like a grinding band. The application of magnetically and electrically non-conductive protective bodies, such as semi-precious stones, in the range of the working air gap, may perhaps overcome these difficulties, but is not greatly advisable by reasons of the technique of production.

A third disturbing factor with the known sound heads is the formation of a stray field lateral to the working air gap which causes an undesirable enlargement of the sound track recorded or which effects an overlapping thereof when the interval between two adjacent sound tracks is dimensioned too small, which adversely affects the recording and reproduction particularly of low frequencies.

According to the invention a sound head as referred to hereinabove is characterised by protective plates consisting of electrically conductive magnetically non-permeable material which lie closely against the pole pieces on both sides of the air gap in such a manner that the mutual position of the pole pieces is fixed, that mechanical wear and tear of the outer narrow faces of the pole pieces is substantially prevented, and that the formation of a stray field emerging laterally from the pole pieces is reduced.

This very simple structural measure solves the problems mentioned hereinabove to an entirely sufficient extent, and allows a simpler and more advantageous general structure of the sound head as compared with the known forms of construction thereof.

In what follows, two special embodiments of the sound heads according to the invention will be described by way of example, and it will be understood that while I have described what may be considered as preferable embodiments of my invention, I do not limit myself to the precise conditions or proportions herein set forth, as they may be varied by those skilled in the art in accordance with the particular purposes for which they are intended, and the conditions under which they are to be utilised.

Fig. 1 shows a longitudinal section, and

Fig. 2 a cross section of a first embodiment.

Fig. 3 shows a top plan view of a further embodiment, while

Fig. 4 shows a section parallel to the plane of the drawing of Fig. 3.

Figures 1, 2, 5:
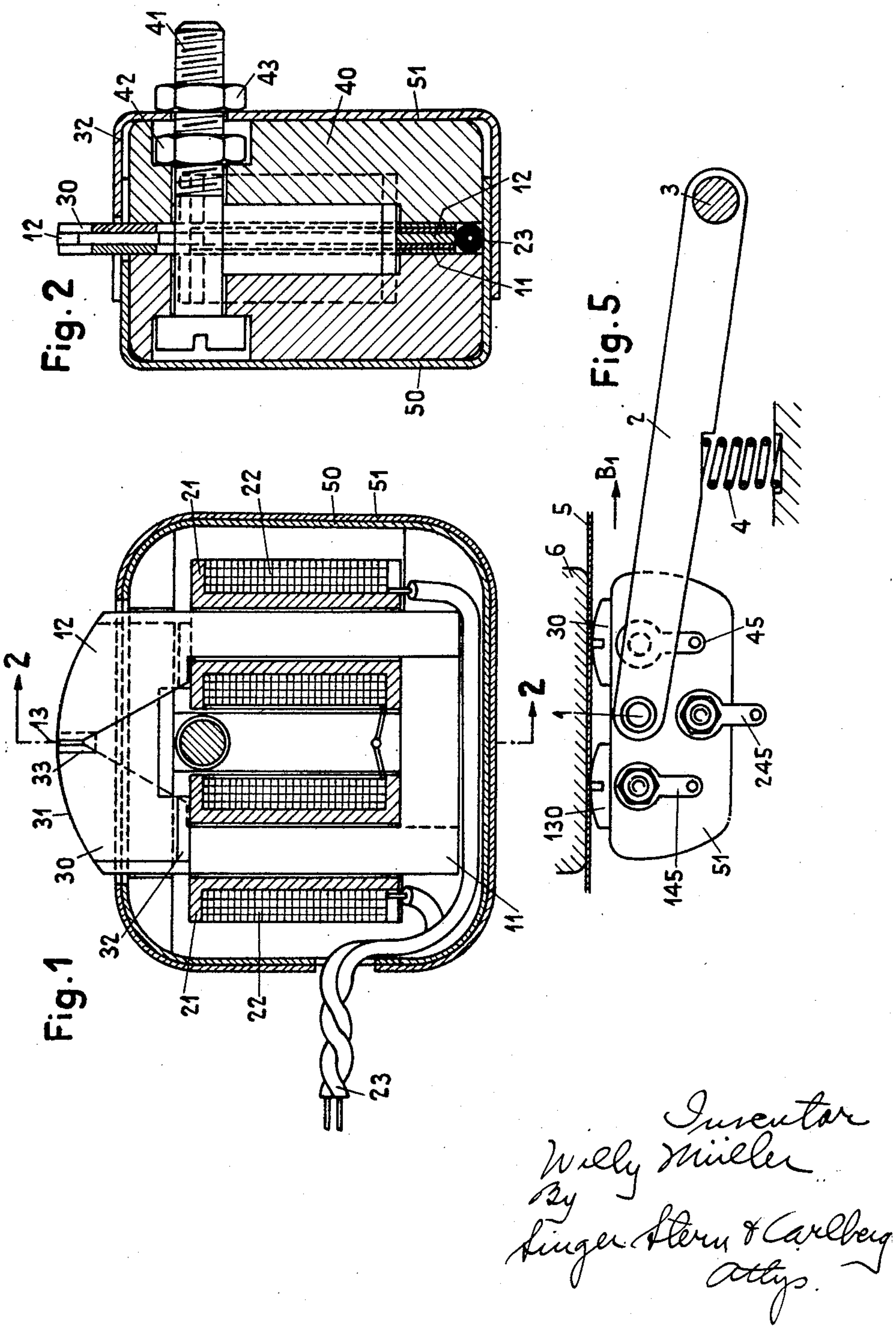
Fig. 5 shows an embodiment according to Figs. 3 and 4 on a reduced scale (being nearer the actual size than Figs. 1 to 4) in operative position.

In all figures corresponding components are denoted by the same references.

The iron core of an electromagnet consists mainly of a plurality of U-shaped magnet laminations 11, while the pole pieces each consist of one magnet lamination 12 which can be shifted into the legs of the finished packet of the magnet core. In order to form the intervals required therefor, merely straight transverse pieces can be inserted instead of U-shaped laminations into the packet at the relevant places. These pole piece laminations 12 are advantageously stamped out of highly permeable magnet laminations, for example of Permalloy or Mu-Metal (these being the names of proprietary articles), the thickness being conveniently chosen 0.008 to 0.016". It is possible to compose each pole piece by stratification of two or three thinner laminations if desired. Before the insertion of the pole piece laminations 12, previously wound coil bodies 21 are fitted on to the legs of the packet of laminations, the coils 22 of which are connected in series, and the terminals of which, e. g. 23, are led outside. After the insertion of the said pole piece laminations 12, protective plates 30 are fitted on both sides of the pole pieces which are flush along their outer contours 31 with the outer contours of the pole pieces, and which have attachment lugs 32 projecting at right angles.

Moreover the protective plates 30 have each a recess 33 within the range of the working air gap 13 which magnetically separates the pole pieces from one another. The protective plates consist of electrically conductive, magnetically non-permeable material, which is intended to give the best possible protection against the grinding action of the sound track carrier. A very suitable material is for example beryllium bronze. Onto the components assembled so far, moulded shells 40 of insulating material can be superimposed from both sides which embrace the coil bodies 21 as well as the aforesaid holder lugs 32 of the protective plates (see also Fig. 4), and which are screwed by means of bolts 41 and nuts 42 to one another.

Prior to the tightening of the nuts 42, all components are brought into their right position, particularly the air gap is adjusted to the desired width of 0.008 to 0.016". By the tightening of the nuts 42 all components are immovably pressed together, and particularly the protective plates 30 form stiffening members for the pole piece laminations 12, which are thereby prevented from performing relative movements. Moreover these protective plates save the pole piece laminations 12 from mechanical injuries and prevent a rapid wearing-out of the same by the grinding action of the sound track carrier. Finally, these protective plates reduce the formation of stray fields emerging laterally from the pole piece laminations because any component of a magnetic line of force standing perpendicular to the protective plates induces eddy currents in the protective plates whereby these transverse components are offered a great magnetic resistance. Thereby particularly lower frequencies are more effectively recorded and reproduced. Moreover the width of the track, which is determined by the overall thickness of the laminations of the pole pieces and which as stated hereinbefore can be chosen smaller than 0.02", is then not enlarged by the stray field, so that it is made possible to chose an interval of less than 0.02" between adjacent tracks without incurring the danger of overlapping, which results in a considerable increase of the recording capacity of a sound track carrier. For example it is made possible, by selecting a width of the track of 0.008" and a mutual distance of adjacent edges of sound tracks of 0.004" to record on a sound track carrier band of 1.2" width as many as 100 tracks.

Moreover outer screening shells 50 and 51 of magnetically permeable material are provided which together embrace all components except the portions of the pole piece laminations and of the protective plates which project outward, the shell 51 overlapping the shell 50 and being screwed on to the bolt 41 by means of the nut 43. These screening shells prevent by their combined action the emergence of stray fields from the sound head casing, and particularly screen the magnet system of the sound-head against interference by external stray fields so that it is for example unnecessary particularly to screen the driving motor and the connections to the mains of an appliance.

Figures 3, 4:
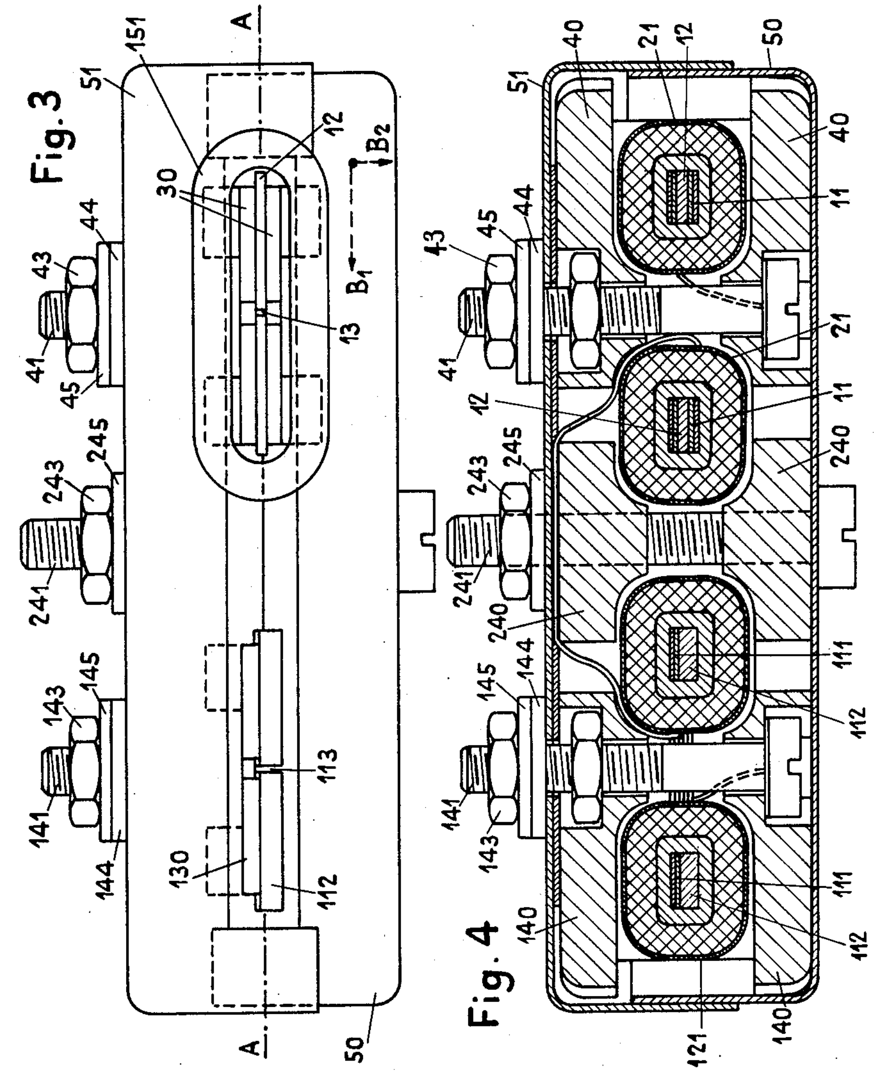

The embodiment according to the Figs. 3 and 4 is distinguished from that according to the Figs. 1 and 2 particularly thereby, that the sound-head is mounted in the same casing together with an effacer-head.

The effacer head is inherently constructed exactly in the same way as described with reference to Figs. 1 and 2, i. e. it consists also of a packet of magnet laminations on to which the ready wound coil body is fitted, whereafter pole piece laminations are inserted into the legs of the core packet. However, it will be apparent from Fig. 3, that the total thickness of the pole pieces 112 of the effacer head is at least twice as big as that of the pole pieces 12 of the sound-head. Moreover the said pole pieces 112 are offset relative to the longitudinal centre plane A—A of the sound-head, so that when guiding the sound-head in the direction of the arrows $B_1$ and $B_2$ the track lying within the range of the sound-head as well as the next adjacent track are effaced while the sound head records a new track.

The assembly of a combined sound-and effacer-head of the kind described is effected as follows: Ready wound coil bodies 21 and 121, respectively, are fitted on to the legs of each of the U-lamination packets 11 and 111 respectively, whereafter the pole pieces 12 and 112, respectively, can be inserted in the required number. After protective plates 30 have been fitted on both sides of the sound-head 12, and a protective plate 130 has been fitted to one side of the effacer head only, three pairs of moulded shells 40, 140 and 240 can be fitted from both sides which embrace the coil bodies 21 and 121 and the holder lugs of the protective plates and which are screwed together by means of the screws 41 and 141, after the working air gaps 13 and 113 have been accurately adjusted. Thereafter screening shells 50, 51 of ferromagnetic material can be superimopsed from both sides and attached in such a manner as described with reference to the Figs. 1 and 2. The sound head is here moreover surrounded by an additional screening sheet 151 which supplements the screening action of the shells 50 and 51.

Figures 6, 7, 8, 9, 10, 11, 12:
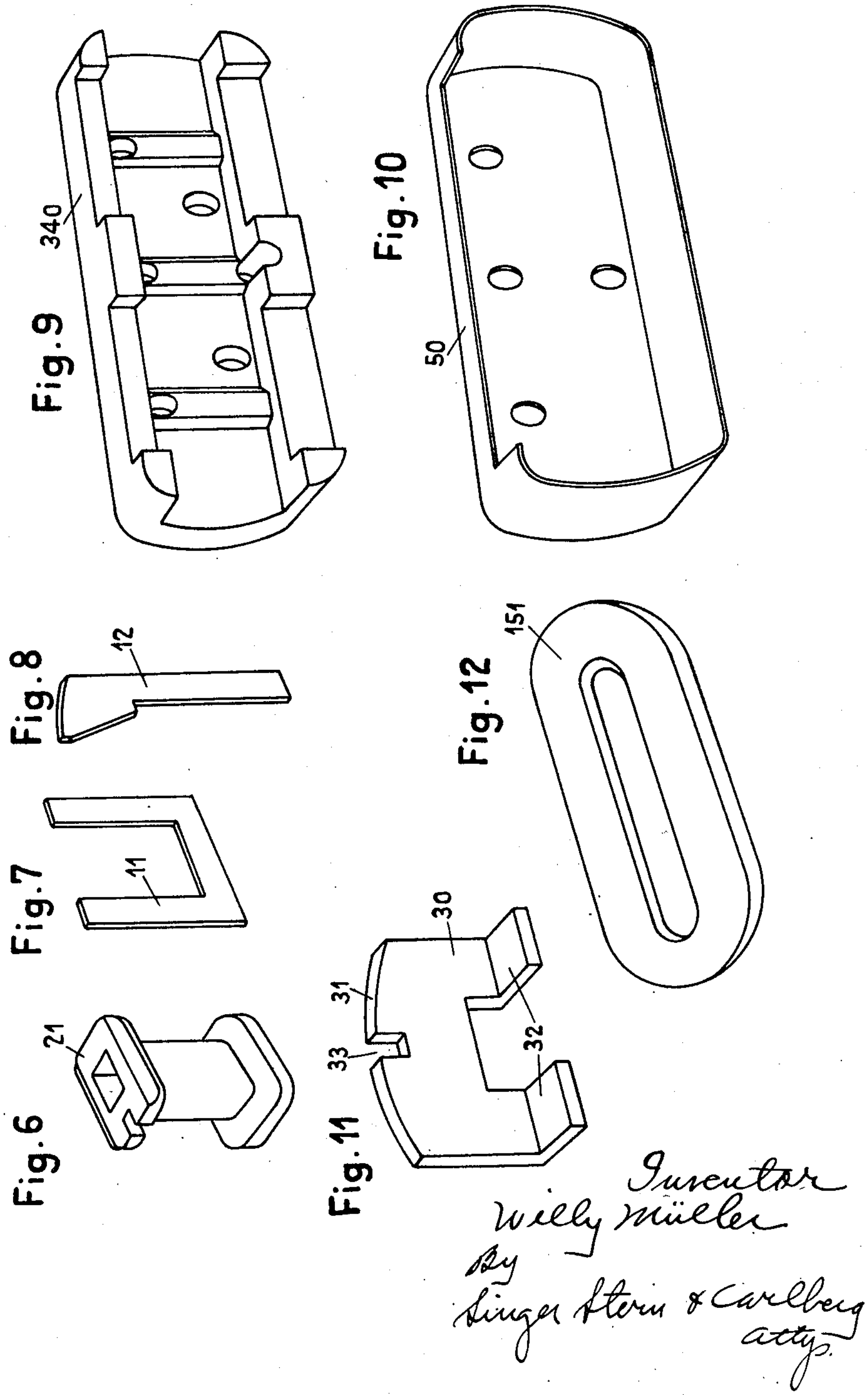
Figs. 6 to 12 show details in perspective views.

If desired, it is possible without any difficulty to interpose insulating discs 44 and 144 and soldering flags 45, 145 and 245 between the outer attachment nuts 43, 143 and 243 and the screening shells, in order to be able to attach the exciter current leads to these soldering flags, while the terminals of the coils are connected in the interior of the sound head to the corresponding screws. Obviously it would be possible to use a single pair of moulded shells instead of using three pairs of them, the single pair then embracing and holding together the components of the effacer head as well as those of the sound-head. Thereby the assembly is still further simplified. Such an integral moulded shell for a combined sound-head and effacer head is shown in Fig. 9 and denoted 340.

All the components of sound-heads of the kind referred to can be prefabricated and assembled in a very simple manner so that, when break-downs occur, the defective components can be readily exchanged. Electromagnetically these sound-heads excel through being completely screened against the environment and by a uniform quality of transducing in the whole range of useful frequencies, while being mechanically very stable and resistant to wear and tear.

In Fig. 5 a combined sound- and effacer-head according to the Figs. 3 and 4 is shown in its operative position on a scale which is reduced as compared with that of the Figs. 3 and 4 and corresponds more nearly to its natural size. The whole casing which is formed by the protective plates 30 and 130 and the screening shells 50 and 51 as well as by the soldering flags 45, 145, 245 described, is tiltably attached on a pivot pin 1 between the sound-head and the effacer-head which pivot belongs to a carrier arm 2, which is in turn pivotally mounted at 3 and is pressed upwards by the compression spring 4, so that both magnetic heads bear on to the sound carrier band 5 with free play, which band is passed under a resilient counter plate 6 in the direction of the arrow $B_1$.

In Figs. 6 to 12 the structural elements used for the assembly of a sound head according to the invention are shown individually.

Fig. 6 shows the construction of a coil body 21 which is manufactured in a manner known in itself from any suitable artificial mass and which, after having been wound-upon with a coil 22 (see Fig. 1), is pushed over the core piece packet. The shape of the core laminations 11 mentioned in the preceding description and that of the pole piece laminations 12, will be seen in Figs. 7 and 8 respectively. These pieces of laminations are punched out of high-grade magnet steel sheet.

As already mentioned by the way hereinabove, Fig. 9 shows a moulded shell 340 which is intended for the assembly of a combined sound- and effacer-head, and which is made of insulating material, for example by moulding under pressure. Such moulded pieces are intended for embracing the coil bodies and attachment lugs of the protective plates and to be screwed together in such a manner that all parts are immovably fixed relative to one another.

Fig. 10 shows the embodiment of a screening shell 50 or 51 made of magnet steel sheet, as provided for the assembly of the combined sound- and effacer-head according to Figs. 3 to 5.

Fig. 11 shows an isometric view of a protective plate 30 which is preferably pressed out of beryllium bronze, the outer contour line of which (31) is interrupted by a recess 33. The protective plate is provided with holder lugs 32 which project at a right angle. Finally, Fig. 12 shows the embodiment of a screening lamination 151 stamped out of magnet steel sheet which is adapted to be additionally cemented around the pole pieces.

What I claim as my invention and desire to secure by Letters Patent, is:

1. In combination with a magnetic sound track carrier, a magnetic recording and reproducing transducer for sound track carriers on which the sound track is to be recorded or is recorded along a helical line, a magnet core comprising a stack of U-shaped magnet laminations, at least two other laminations positioned within said stack in a common plane and projecting outwardly from the free ends of the legs of said U-shaped core, the projecting ends of said other laminations being shaped to constitute pole pieces with curved end edges for engaging a flexible magnetic record and an air gap between the opposed projecting ends, magnet coils placed on the legs of said U-shaped magnet core, protective plates consisting of wear resisting material arranged adjacent both side faces of the projecting ends of said other laminations and having outer edges flush with the curved edges of the pole pieces of the same for engaging the sound track carrier and thereby reducing wear on the edges of the pole pieces, and means on said protective plates attaching the same to the adjacent end faces of the magnet coils.

2. In combination with a magnetic sound track carrier, a magnetic recording and reproducing transducer for sound track carriers on which the sound track is to be recorded or is recorded along a helical line, a magnet core comprising a stack of U-shaped magnet laminations, at least two other laminations positioned within said stack in a common plane and projecting outwardly from the free ends of the legs of said U-shaped core, the projecting ends of said other laminations being shaped to consitute pole pieces with curved end edges for engaging a flexible magnetic record and an air gap between the opposed projecting ends, magnet coils placed on the legs of said U-shaped magnet core, protective plates of wear resisting electrically conductive magnetically non-permeable material arranged adjacent both side faces of the projecting ends of said other laminations and having outer edges flush with the curved edges of the pole pieces of the same for engaging the sound track carrier and thereby reducing wear on the edges of the pole pieces, and means on said protective plates attaching the same to the adjacent end faces of the magnet coils.

3. In combination with a magnetic sound track carrier, a magnetic recording and reproducing transducer for sound track carriers on which the sound track is to be recorded or is recorded along a helical line, a magnet core comprising a stack of U-shaped magnet laminations, at least two other laminations positioned within said stack in a common plane and projecting outwardly from the free ends of the legs of said U-shaped core, the projecting ends of said other laminations being shaped to constitute pole pieces with curved end edges for engaging a flexible magnetic record and an air gap between the opposed projecting ends, magnet coils placed on the legs of said U-shaped magnet core, protective plates of wear resisting electrically conductive magnetically non-permeable material arranged adjacent both side faces of the projecting ends of said other laminations and having outer edges flush with the curved edges of the pole pieces of the same for engaging the sound track carrier and thereby reducing wear on the edges of the pole pieces, and means on said protective plates attaching the same to the adjacent end faces of the magnet coils, said protective plates being provided with recesses at the range of the air gap between said pole pieces.

4. In combination with a magnetic sound track carrier, a magnetic recording and reproducing transducer for sound track carriers on which the sound track is to be recorded or is recorded along a helical line, a magnet core comprising a stack of U-shaped magnet laminations, at least two other laminations having each a thickness not exceeding .02 inch positioned within said track in a common plane and projecting outwardly from the free ends of the legs of said U-shaped core, the projecting ends of said other laminations being shaped to constitute pole pieces with curved end edges for engaging a flexible magnetic record and an air gap between the opposed projecting ends, magnet coils placed on the legs of said U-shaped magnet core, protective plates of electrically conductive magnetically non-permeable material arranged adjacent both side faces of the projecting ends of said other laminations and having outer edges flush with the curved edges of the pole pieces of the same for engaging the sound track carrier and thereby reducing wear on the edges of the pole pieces, and means on said protective plates attaching the same to the adjacent end faces of the magnet coils, molded shells of insulating material placed against opposite sides of said U-shaped stack and the coils thereon and covering the entire magnet structture except the portion of the pole pieces and protective plates having the air gap and recesses respectively, and means for damping said molded shells about said magnet structure.

5. A magnetic recording and reproducing transducer as claimed in claim 4, including screening shells of magnetically permeable material enclosing said molded shells.

6. In combination with a magnetic sound track carrier, a magnetic recording, reproducing and effacer head for sound track carriers on which the sound track is to be recorded or is recorded along a helical line, two magnet cores, each comprising a stack of U-shaped magnet laminations and at least two other laminations positioned within each stack in a common plane and projecting outwardly from the free ends of the legs of each stack, the projecting ends of said other laminations being shaped to constitute pole pieces with curved end edges for engaging a flexible magnetic record and an air gap between the opposed projecting ends, magnet coils on the legs of said U-shaped magnet cores, said cores being arranged with all four legs in a single plane, whereby one core forms the recording and reproducing magnet and the other core forms the effacer magnet, protective plates of wear resisting material positioned adjacent both sides of the projecting ends of said pole pieces and shaped to be flush with the curved end edges of the same for engaging the sound track carrier and thereby reducing wear on the edges of the pole pieces, and molded shells of insulating material placed against opposite sides of said U-shaped stacks and the coils thereon and covering both magnet structures, except the outer portion of the pole pieces and protective plates adapted to engage the magnetic record.

7. In combination with a magnetic sound track carrier, a magnetic recording, reproducing and effacer head for sound track carriers on which the sound track is to be recorded or is recorded along a helical line, two magnet cores, each comprising a stack of U-shaped magnet laminations and at least two other laminations positioned within each stack in a common plane and projecting outwardly from the free ends of the legs of each stack, the projecting ends of said other laminations being shaped to constitute pole pieces with curved end edges for engaging a flexible magnetic record and an air gap between the opposed projecting ends, magnet coils on the legs of said U-shaped magnet cores, said cores being arranged with all four legs in a single plane, whereby one core forms the recording and reproducing magnet and the other core forms the effacer magnet, protective plates of wear resisting material positioned adjacent both sides of the projecting ends of said pole pieces and shaped to be flush with the curved end edges of the same for engaging the sound track carrier and thereby reducing wear on the edges of the pole pieces, and molded shells of insulating material placed against opposite sides of said U-shaped stacks and the coils thereon and covering both magnet structures, except the outer portion of the pole pieces and protective plates adapted to engage the magnetic record, the pole pieces forming a part of the effacer magnet being at least twice as thick as the pole pieces forming a part of the recording and reproducing magnet.

8. In combination with a magnetic sound track carrier, a magnetic recording, reproducing and effacer head for sound track carriers on which the sound track is to be recorded or is recorded along a helical line, two magnet cores, each comprising a stack of U-shaped magnet laminations and at least two other laminations positioned within each stack in a common plane and projecting outwardly from the free ends of the legs of each stack, the projecting ends of said other laminations being shaped to constitute pole pieces with curved end edges for engaging a flexible magnetic record and an air gap between the opposed projecting ends, magnet coils on the legs of said U-shaped magnet cores, said cores being arranged with all four legs in a single plane, whereby one core forms the recording and reproducing magnet and the other core forms the effacer magnet, protective plates of wear resisting material positioned adjacent both sides of the projecting ends of said pole pieces and shaped to be flush with the curved end edges of the same for engaging the sound track carrier and thereby reducing wear on the edges of the pole pieces, and molded shells of insulating material placed against opposite sides of said U-shaped stacks and the coils thereon and covering both magnet structures, except the outer portion of the pole pieces and protective plates adapted to engage the magnetic record, the pole pieces forming a part of the effacer magnet being at least twice as thick as the pole pieces forming a part of the recording and reproducing magnet, and the pole pieces of the effacer magnet being arranged offset with respect to the pole pieces of the recording and reproducing head, so as to efface in addition to the sound track reproduced by the reproducing head also the next adjacent sound track on the magnetic record.

References Cited in the file of this patent

UNITED STATES PATENTS

| | | |
|---|---|---|
| 934,843 | Schaeffer | Sept. 21, 1909 |
| 2,361,752 | Eilenberger | Oct. 31, 1944 |
| 2,479,308 | Camras | Aug. 16, 1949 |
| 2,493,742 | Begun | Jan. 10, 1950 |
| 2,513,617 | Begun | July 3, 1950 |
| 2,524,063 | Masterson | Oct. 3, 1950 |
| 2,530,029 | Pond | Nov. 14, 1950 |
| 2,532,803 | Faus | Dec. 5, 1950 |
| 2,535,480 | Begun | Dec. 26, 1950 |
| 2,536,272 | Friend | Jan. 2, 1951 |
| 2,549,771 | Camras | Apr. 24, 1951 |
| 2,561,365 | Hare | July 24, 1951 |
| 2,563,445 | Zenner | Aug. 7, 1951 |
| 2,565,191 | Zenner | Aug. 21, 1951 |
| 2,590,292 | Anderson | Mar. 25, 1952 |
| 2,592,652 | Buhrendorf | Apr. 15, 1952 |
| 2,596,912 | Nygaard | May 13, 1952 |